(12) United States Patent
Chen et al.

(10) Patent No.: US 9,964,699 B2
(45) Date of Patent: May 8, 2018

(54) SYSTEM AND METHOD FOR USING HOLLOW CORE PHOTONIC CRYSTAL FIBERS

(71) Applicant: The United States of America, as represented by the Administrator of the National Aeronautics and Space Administration, Washington, DC (US)

(72) Inventors: Jeffrey R. Chen, Clarksville, MD (US); Kenji Numata, Laurel, MD (US); Stewart T. Wu, Ellicott City, MD (US)

(73) Assignee: The United States of America, as represented by the Administrator of the National Aeronautics and Space Administraion, Washington, DC (US)

( * ) Notice: Subject to any disclaimer, the term of this patent is extended or adjusted under 35 U.S.C. 154(b) by 283 days.

(21) Appl. No.: 14/859,863

(22) Filed: Sep. 21, 2015

(65) Prior Publication Data
US 2016/0327735 A1 Nov. 10, 2016

Related U.S. Application Data

(60) Provisional application No. 62/157,040, filed on May 5, 2015.

(51) Int. Cl.
| | | |
|---|---|---|
| *H01J 40/14* | (2006.01) |
| *G02B 6/02* | (2006.01) |
| *G02B 6/32* | (2006.01) |
| *G02B 6/26* | (2006.01) |
| *G01J 3/02* | (2006.01) |
| *G01J 3/42* | (2006.01) |

(52) U.S. Cl.
CPC ........ *G02B 6/02328* (2013.01); *G01J 3/0208* (2013.01); *G01J 3/0218* (2013.01); *G02B 6/262* (2013.01); *G02B 6/32* (2013.01); *G01J 2003/421* (2013.01)

(58) Field of Classification Search
CPC .. G02B 6/02323; G02B 6/02338; G02B 6/26; G02B 6/262
USPC .................. 250/227.11, 216; 385/88, 92–94
See application file for complete search history.

(56) References Cited

U.S. PATENT DOCUMENTS 7,379,648 B1 * 5/2008 Brooks .............. G02B 6/02347
385/126

* cited by examiner

*Primary Examiner* — Kevin Pyo
(74) *Attorney, Agent, or Firm* — Christopher O. Edwards; Bryan A. Geurts; Mark P. Dvorscak (57) ABSTRACT

Disclosed herein are systems and methods related to use of hollow core photonic crystal fibers. A system includes a tube and a collimating lens configured in a first end of the tube, wherein a single mode fiber is coupled to a first end of the collimating lens. A second lens is supported by a structure at a second end of the tube, the second lens receiving a first signal from a second end of the collimating lens and outputting a second signal that is coupled into a first end of a hollow core photonic crystal fiber. A first gas tube is configured to introduce gas through the structure into a chamber and a sealant seals at least one of the collimating lens and the structure within the tube. An output signal is received at a detector that catches the entire beam to suppress multiple-mode beating noise.

17 Claims, 7 Drawing Sheets

SYSTEM AND METHOD FOR USING HOLLOW CORE PHOTONIC CRYSTAL FIBERS

BACKGROUND

1. Technical Field

The present disclosure relates to hollow core photonic crystal fibers (HC-PCFs) and more specifically to a system and method of improving fiber coupling and projection of HC-PCF modes onto a detector to suppress unwanted multiple-mode beating noise.

2. Introduction

The concepts disclosed herein relate to the development of a wavelength-stabilized laser transmitter for the Active Sensing of $CO_2$ Emissions over NASA's Nights, Days, and Seasons (ASCENDS) mission. To ensure a 1 parts per million by volume (ppmv) $CO_2$ measurement, the laser wavelength must be stabilized to sub-MHz accuracy because of the high slopes on the sides of the $CO_2$ absorption line near 1572.33 nm to be measured. The locking accuracy exceeds the current state of the art being developed for the telecom industry (±1 GHz) by over 2000 times.

The 1572.33 nm $CO_2$ line selected for measurement turns out to be the locking reference of choice because there are no better references available near this line. The inventors have, for the first time, demonstrated <0.21 MHz drift of a "reference" distributed feedback laser diode (DFB-LD) locked to this absorption line of $CO_2$ in a gas cell using a frequency modulation (FM) technique based on external phase modulation and phase-sensitive detection. Due to the low $CO_2$ absorption strength and low cell pressure (~40 mbar) needed to narrow the linewidth, a long cell path length (18 m for the cell) had to be used to gain high slope of the error signal. It is important to minimize the predominant noise for the locking system. The noise is the time-varying residual amplitude modulation (RAM) stemmed from multi-path interference (MPI) along the optical path, particularly in the gas cell. When the gas cell output beam contains multiple spatial modes, the time-varying multi-mode beating often leads to unwanted RAM in the detector signal. It is highly desirable to use gas filled hollow-core photonic crystal fibers (HC-PCFs) to make the cells compact, light weighted, reliable, and conveniently fiber coupled and sealed.

Various techniques have been used to build all-fiber HC-PCF gas cells. Both ends of a gas filled HC-PCF can be spliced to conventional single mode fibers (SMFs) with a filament splicer, an arc splicer or even a $CO_2$ laser. However, the SMF to HC-PFC splice suffers ~1 dB excessive insertion losses that are linked to the formation of a recess in the end face of the HC-PCF when heated in the splicer. The losses resulted from the action of surface tension along the many glass-air interfaces within the holey structure. Furthermore, such a splicing suffers a 4% Fresnel reflection at the normal-cleaved air-silica splice interface, causing undesirable MPI in the cell.

SUMMARY

The present disclosure addresses the issues raised above with respect to improved approaches for coupling light in and out of a gas filled HC-PCF and sealing the gas with miniature enclosures. To suppress the reflection mentioned above, both fibers can be angle-cleaved (e.g., 8° from normal) and spliced. However, the angle cleave causes 4° beam angle mismatch between a SMF (4° off fiber axis) and the HC-PCF (along the fiber axis). This results in ~0.7 dB additional loss. Sending laser 4° off axis into HC-PCF also launches the light into higher-order transverse modes, resulting in undesirable MPI. Splicing such angle-cleaved joint causes 2 dB more insertion loss due to further misalignment of the fibers and the alteration of the microstructured cladding during splicing.

Furthermore, sealing gases in the HC-PCF cells is quite challenging. In one technique, one end (or both ends) of the HC-PCF is terminated in bulky gas chamber(s) and the laser is coupled in and/or out of the cell though the optical window(s) of the chamber(s).

In another technique, the gas is hermetically sealed inside the HC-PCF by splicing both ends of the gas-filled HC-PCF to SMFs. This method is limited to relatively high gas pressure due to the exposure of the HCP-CF to atmospheric pressure for the duration of the splicing procedure. To avoid air contamination, a HC-PCF section close to the second end of the fiber can be collapsed so that no contamination from outside gases could occur. The drawback of this technique is the ~10 dB optical loss at the collapsed end.

In yet another technique, the first end of a HC-PCF is spliced and sealed to a SMF and the desired low pressure gas is loaded into the cell through the second end. Next, helium gas (with over 1 atm pressure) is also loaded into the cell, again through the second end. The second end of the cell is then quickly spliced and sealed to a SMF in the atmosphere without air contamination. The helium gas will eventually diffused out of the cell through the silica walls of the fiber, leaving only the desired gas in the sealed cell. Another example technique seals both ends of a HC-PCF with SMFs but drills a μm-sized hole with femptosecond laser pulses though the fiber wall and loads the gas into the cell through this hole.

As with SMFs, the fundamental mode in HC-PFCs has a quasi-Gaussian intensity distribution. However, no currently available low-loss HC-PCF is a true single mode waveguide. The HC-PCFs typically support several higher-order core modes and, in some cases, additional "surface" modes located at the core cladding boundary. The higher-order modes (HOMs) could lead to MPI and hence unwanted beating noise in the detector signal.

The design concepts disclosed herein address all these issues and overcome the limitations with previous techniques. The new designs suppress the MPI due to back-reflections at the HC-PCF fiber ends by lens-coupling and angle-cleaving, and suppress MPI due to multiple-mode output beam by allowing the detector surface to catch the entire output beam. Furthermore, the MPI due to the surface modes in the photonic-bandgap HC-PCFs can be avoided by using non-bandgap-based kagome hollow core photonic crystal fibers. These design concepts are described in section below.

In one example, the system according to an example in the disclosure relates to an apparatus including a tube, a collimating lens configured in a first end of the tube, wherein a single mode fiber is coupled to a first end of the collimating lens and a second lens supported by a structure at a second end of the tube, the second lens receiving a first signal from a second end of the collimating lens and outputting a second signal that is coupled into a first end of a hollow core photonic crystal fiber. A first gas tube can be configured to introduce gas in and out of a sealed enclosure and hence the hollow core of the HC-PCF. The enclosure can be formed by hermetically sealing one of the collimating lenses and the first end of the HC-PCF to the structure, and the sealed enclosure is positioned and held inside the outer tube by solders. A third signal output from a second end of the hollow core photonic crystal fiber is received at a detector. The detector is placed close to the output end of the HC-PCF such that the fiber modes remain orthogonal to each other on the detector surface. All of the light output from the HC-PCF needs to be caught by the detector to suppress the beating noise. To do this, the detector can be 1 mm away from the HC-PCF output. Embodiments include one using a focusing lens and another without the use of a focusing lens.

The apparatus can include a third lens (that can be a single lens or a pair of lenses) and a second structure that supports a second end of the hollow core photonic crystal fiber. A second outer tube (not shown) can also be included, wherein the second structure supports a second gas tube and the third lens, wherein the third signal is output from the second end of the hollow core photonic crystal fiber through the third lens to the detector. The second outer tube functions similarly to the first outer tube at the input end. The second outer tube positions and holds (by solder or other methods) the structure 202 and the detector. The third lens, the second gas tube and the second end of the HC-PCF are hermetically sealed to the second structure to form a second enclosure.

In another example, the first enclosure and the second enclosure can be combined such that the HC-PCF is contained within the same enclosure.

The second gas tube can introduce gas in and out of the second structure and hence the hollow core of the HC-PCF. The first end of the HC-PCF and the second end of the HC-PCF can be angle-cleaved. The single mode fiber can output light which is coupled via the collimating lens and the second lens into a fundamental mode of the HC-PCF. The second lens can be a collimating lens. A filter can also be positioned between the first collimating lens and the second collimating lens.

The coupling for the first end of the HC-PCF and the second end of the HC-PCF suppresses back reflections into the system. The first end of the HC-PCF and the second end of the HC-PCF are cleaved without an angle in one aspect. In another aspect, the first end of the HC-PCF and the second end of the HC-PCF are cleaved at an angle.

When the first end of the HC-PCF is angle cleaved, the mating end of the input fiber can be cleaved at a corresponding angle and butt coupled to the HC-FCF, resulting in two fibers at an angle so that light is launched straight into the hollow core.

DETAILED DESCRIPTION

A system, method and computer-readable storage devices are disclosed which relate to structures for processing a signal from a single mode fiber, through a hollow core photonic crystal fiber, to a detector.

Various embodiments of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

The disclosure first addresses the residual amplitude modulation (RAM) issue stemmed from the multi-mode propagation in HC-PCF$_S$. One example of the HP-PCF that can be applied herein is a non-bandgap-based kagome hollow core photonic crystal fiber, although other fibers are also within the scope of this disclosure. The beating among multi transverse modes of an optical fiber causes multi-path interference (MPI), resulting undesirable RAM. This problem can be avoided by taking advantage of the orthogonality among the transverse modes of the output beam. If the fiber transverse modes are projected onto a photo detector surface properly and the effective detector surface area is large enough to catch essentially all the light, then these modes on the detector surface remain orthogonal when integrated across the detector surface area. Consequently, all the interferences between different transverse modes vanish. This removes the RAM arising from the interference among multiple fiber transverse modes. In general, this method is applicable to the detection of any multiple-mode output beam. The sum of the unwanted beating noise can be suppressed by allowing the detector to catch the entire output beam, which can be approximately achieved in two ways as described below.

Figure 1A:
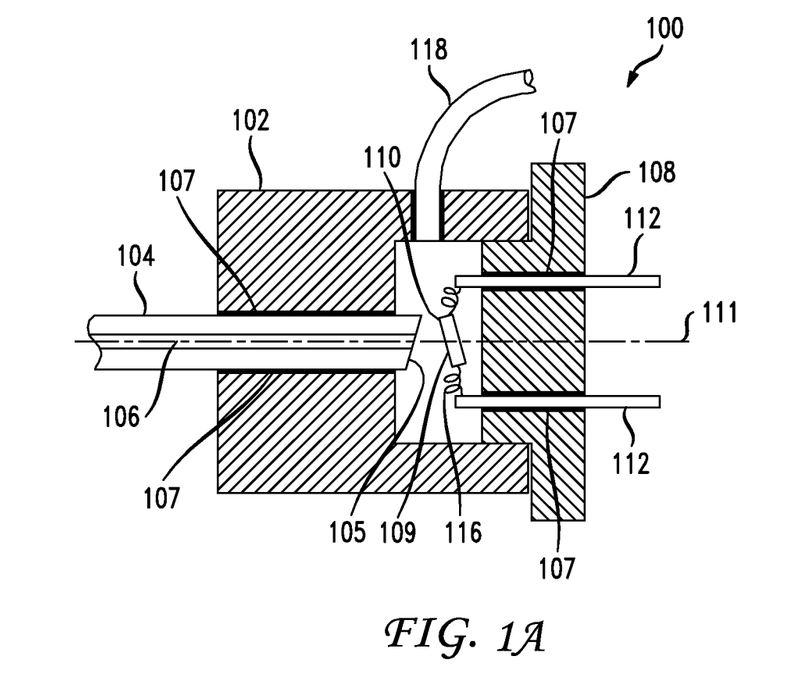
FIG. 1A illustrates a first example structure for use with a detector.
Figure 1B:
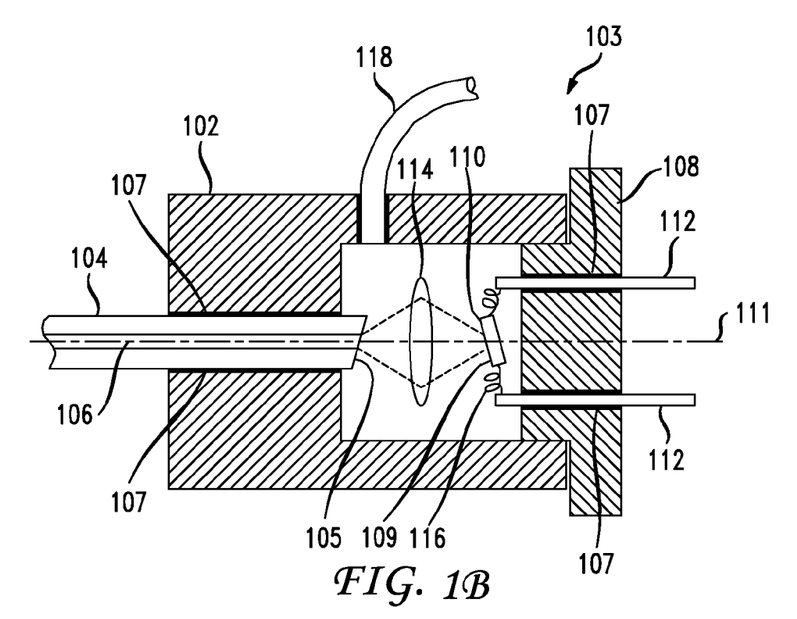
FIG. 1B illustrates a second example of a structure for use with a detector.
Figure 2:
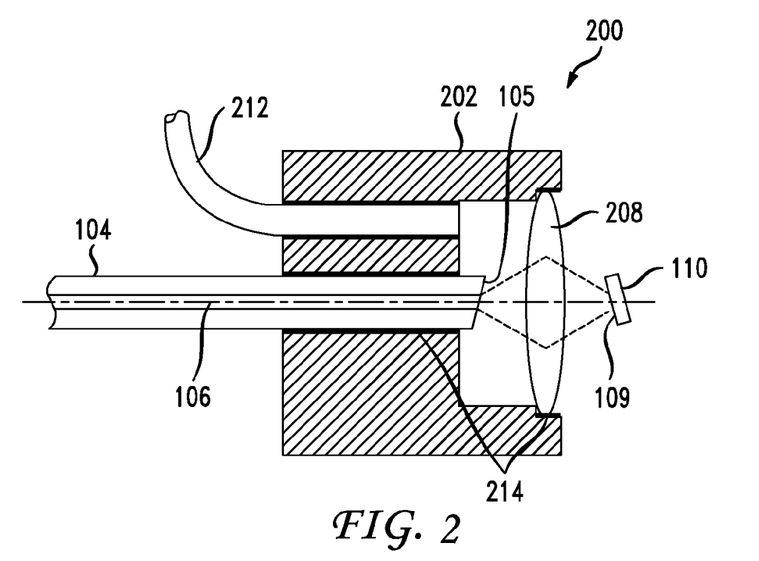
FIG. 2 illustrates another example structure used for detection.

FIGS. 1A, 1B and 2 illustrate systems, apparatuses or structures for resolving some of these issues and illustrate example relay optics used to image the HC-PCF fiber end onto the photo-detector surface in order to avoid MPI stemmed from the beating among multi-transverse modes in the HC-PCF.

FIG. 1A shows a first example structure that addresses the issues by placing the photo-detector surface 109 of a photodetector 110 close to the output end of the HC-PCF 104

(with hollow core 106) so that the fiber modes remain orthogonal to each other on the detector surface 109. Calculations indicate that the fiber modes are orthogonal even when the detector 110 is 1 mm away from the fiber end 105. In practice, the detector 109 is preferably even closer to the fiber end in order to catch essentially all the light out of the fiber. The detector 109 area D can be made large enough (e.g., ~100 μm dia.) to catch the light while still allowing sufficient detector bandwidth (e.g., >1 GHz).

It is worth noting that transverse modes in HC-PCF are no longer eigenmodes in free space or in the single mode fiber (SMF) and thus will typically be distorted when propagating in free space or in the SMF. For example, a delivery SMF between the HC-PCF 104 and the detector 109 will cause MPI on the detector 109 because modes (fundamental mode and HOMs) from the HC-PCF 104 will be coupled into the single mode in the SMF and will beat to each other on the detector surface. Such a delivery SMF should be avoided.

An end 105 of the HC-PCF 104 can be normal-cleaved or angle-cleaved. FIG. 1A shows an angle-cleaved end 105. The detector surface 110 is preferably antireflective (AR) coated to reduce back reflection, and can be normal to the fiber axis 111 or tilted at an angle to avoid residual reflection back to the fiber core. The orientation of this tilt can be parallel or anti-parallel to the angle-cleaved fiber end surface. The fiber end can be hermetically sealed 107 to a miniature enclosure formed by a can 102, to which the fiber end is sealed 107, and a lid 108 through which the detector leads 112 are fed trough hermetically such that leads 112 can be connected to the detector 110. An example diameter of the can 102 is, for example, 3-5 mm. An example diameter of the nipple of the lid 108 is 2 mm. A small gas tube 118 can be connected to this enclosure for evacuation, purging and gas loading of the HC-PCF cell. Example dimensions for the gas tube 118 (and other gas tubes disclosed herein) include an inner diameter of ⅟₃₂" and an outer diameter of ⅟₁₆". The gas tube 118 can be terminated to seal the HC-PCF cell at a fixed gas pressure. Once the gas fills the chamber, the tubes can be terminated to a short length (such as less than 25 mm) and sealed by crimping and soldering/welding or by any other approach. The fiber end 105, preferably angle-cleaved, can also be sealed with a thin glass end cap (not shown) and the detector can be attached to the end cap (not shown). If there is such an end cap, it can also be hermetically sealed. All of the diameter and distance values disclosed herein are examples only and can vary in either direction by 35%.

The general structure of FIG. 1B is similar to FIG. 1A with the addition of the relay optics 114. The optics 114 can have a diameter in a range of 1-4 mm. As shown in FIG. 1B, relay optics 114 can be inserted to project the output beam from the HC-PCF 104 onto the detector 110, as long as such relay optics 114 preserves the orthogonality among the HC-PCF modes on the detector surface 109 as described above. An imaging lens or a pair of lenses can perform this task. In this example, a positive lens 114 images the signal from the fiber end onto the detector surface 109. Just as the image is an inverted and magnified replica of the object, the field on the detector surface 109 is also an inverted and magnified (by the same magnification for the image) replica of the field on the fiber end 105, but multiplied by a phase factor. Calculations show that the phase factor can cancel out between two beating modes on the detector under practical conditions. Consequently, the fiber transverse modes remain orthogonal to each other when they hit the detector surface 109, and thus do not beat to each other to cause RAM.

Figure 3A:
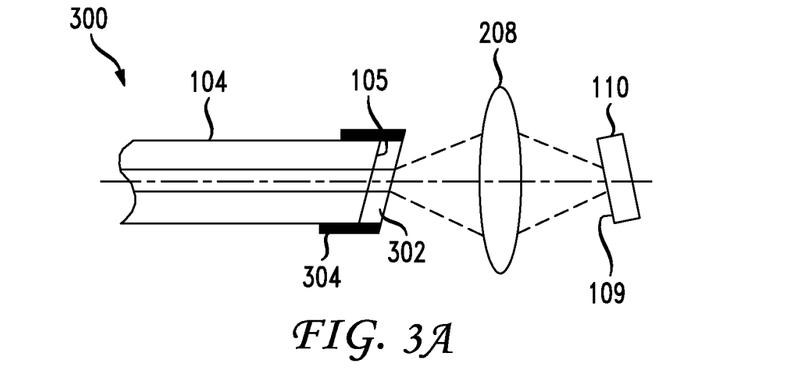
FIGS. 3A-3C illustrate various configurations related to detectors.
Figure 3B:
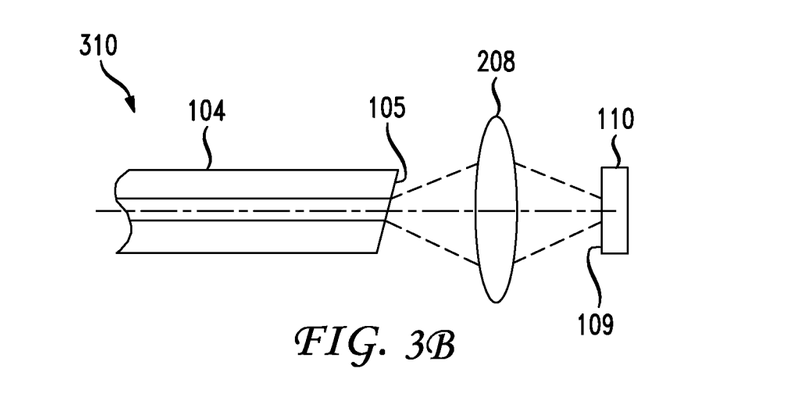
Figure 3C:
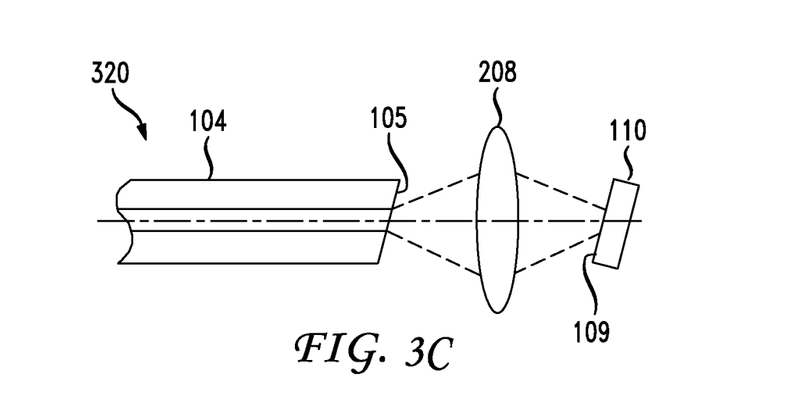

FIG. 1B shows an example of how the HC-PCF end 105 can be sealed to detector package enclosure 102. FIG. 2 shows another example of how the HC-PCF end 105 can be sealed to the relay optics 208 with an enclosure 202. In both cases, a small gas tube 118, 212 can again be connected to the respective enclosure 102, 202. The aperture of the lens 114, 208 needs to be larger than the extent of the incident beam so its diffraction effect can be neglected. The effective detector surface area 109 of the detector 110 needs to be large enough to catch essentially all the laser light from all fiber modes. The fiber end 105 can optionally be sealed to a glass end cap 302 with hermetic sealing 304 as is shown in FIG. 3A. In all variations, the fiber end 105 is preferably angle-cleaved and the detector surface 109 can be normal to the optical beam as shown in the structure 310 shown in FIG. 3B, or tilted at angle as shown in FIGS. 3A and the structure 320 in FIG. 3C. The orientation of the tilt can be parallel (FIG. 3C) or anti-parallel (FIGS. 3A, 3B) to the angle-cleaved fiber end 105.

It should be noted that the figures disclosed herein are meant to be illustrative but not necessarily to the exact scale. Further, various techniques exist to implement the hermetic seals in the designs. For example, the gas tube 118, 212 can be brazed to the enclosure at a higher temperature (using induction heating) so the seal will not be affected by later soldering steps at lower temperatures. The HC-PCFs 104 can be hermetically sealed 107, 214 to the enclosures using glass soldering, metal soldering or epoxy. The lens 208 can be sealed to the enclosure 214 using epoxy or metal soldering. The enclosure lid 108 in FIG. 1 can be sealed to the can using epoxy, soft soldering, electron-beam or laser welding. Other approaches can also be applied as well.

Figure 4:
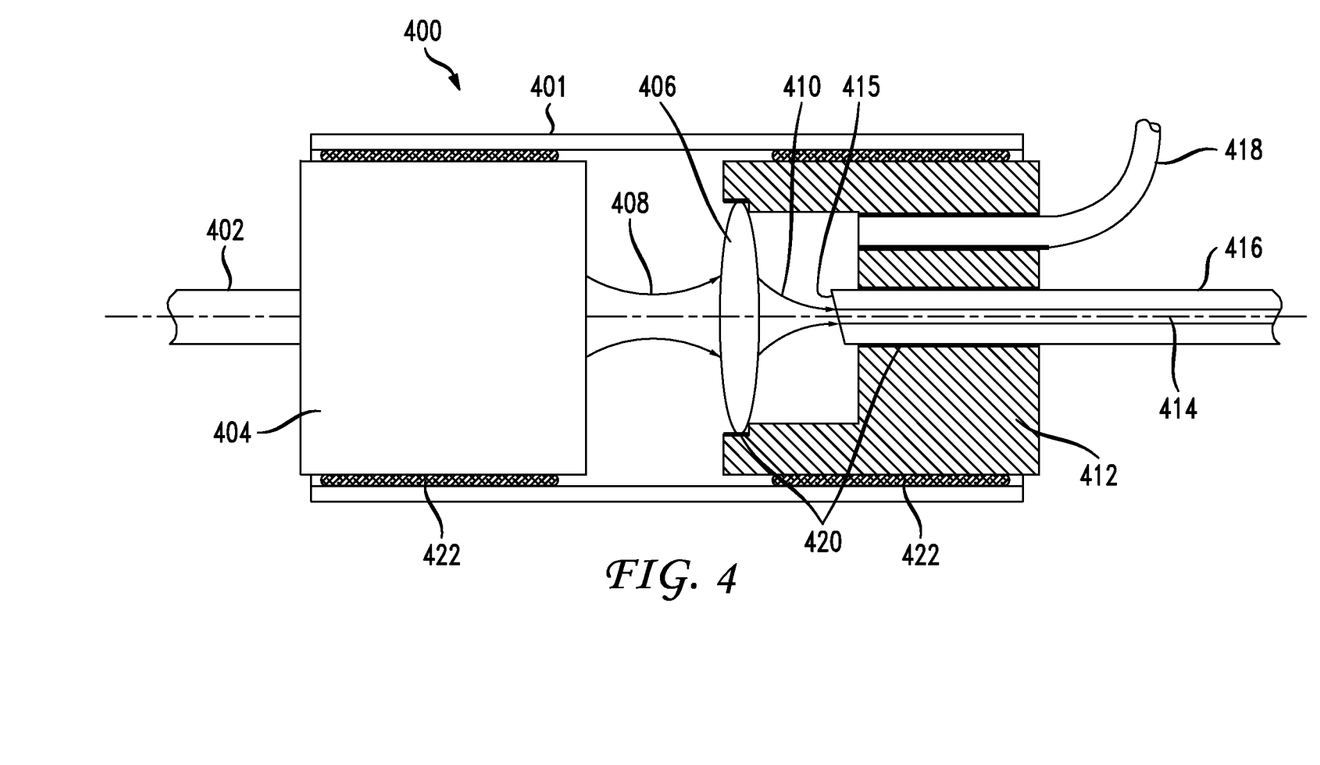
FIG. 4 illustrates an example design for coupling the output of a single mode fiber to an HC-PCF.

The disclosure next describes an example design for coupling and sealing at the input end of the HC-PCF 104. The example structure is shown in FIG. 4, which illustrates a design to couple the output of a SMF 402 into a HC-PCF 416 using collimating lenses 404 and 406 and to seal and load the HC-PCF cell. The design goals are: 1) to efficiently couple the output of a SMF 402 into the fundamental mode of the HC-PCF 416, but to minimize the fraction coupled into HOMs; 2) to avoid reflection at the coupling interface between the SMF 402 and the HC-PCF 416; 3) to seal the HC-PCF end 415; and 4) to allow gas loading into the cell. The apparatus uses collimating lenses 404 and 406 to couple the SMF 402 to the HC-PCF 416, rather than butt splicing the two together. Each fiber is attached to its collimating lens 404 (or 406) that collimates the fiber's fundamental-mode output into a quasi-Gaussian beam with a beam waist 408 typically 0.5 mm or larger in diameter, located a few mm or farther from the lens. Beam waists 408 from both collimated beams are about equal in diameter and are aligned to coincide with each other. This maximizes the coupling efficiency into the fundamental mode and minimizes the fraction coupled into HOMs of the HC-PCF 416. The lens coupling also suppresses the back reflection into the HC-PCF 416. This is because the AR coated lens is away from the HC-PCF fiber end 415 and a small tilt of a flat lens surface will prevent the residual reflection from going back to the fiber core. Example diameters for each lens or optical feature disclosed herein is in the range of 1-4 mm.

As shown in FIG. 4, the end 415 of the HC-PCF fiber 416 is angle-cleaved and is sealed to a can 412. Its AR coated collimating micro-lens 406 is also sealed 420 to the can 412, forming a hermetic enclosure. A small gas tube 418 can be connected to this enclosure 412, again for evacuation, purging and gas loading of the cell. The gas tube 418 can be terminated to seal a fixed gas pressure in the cell.

Techniques to align and package such coupling mechanism will be known to those of skill in the art. For example, two fiber-pigtailed collimators can be held in aligned position by soldering them to the outer tube. They can be actively aligned while the solder is heated and melted. The solder is left to cool and solidify to lock the position of the collimators. This design can also be used in reverse direction to couple the output of the HC-PCF to the SMF, or to couple light between two HC-PCFs. Free space optical elements, such as optical filters and isolators, can also be inserted between the two collimators to add desired functionalities.

The designs presented herein allow HC-PCF gas cells 400 to be free of MPI and thus enable FM spectroscopy based applications, such as sub-MHz laser wavelength stabilization not possible with previous HC-PCF cell technologies.

This disclosure next addresses the issue with splicing the SMF 402 to the HC-PCF 416. It is important to note that the minimum SMF to HC-PCF coupling loss can be reached by butting the two fiber ends together without splicing them. The splicing (fusing and overlapping) offers mechanical strength but causes 1-2 dB excess insertion loss. The techniques disclosed herein avoid the excess loss by not fusing and overlapping the fiber ends. Instead, a glass soldering can be used to bond and seal the two butt-coupled fiber ends with excellent mechanical strength. The two fiber ends can be either normal-cleaved or angle-cleaved and the end faces can also be polished. They can be brought into butt-coupling using existing techniques.

An exemplary procedure using arc spicier is described below. The splicer first aligns the fibers and produces a pre-fuse arc to remove any contamination present in the fiber ends and to remove any moisture in the microstructures. Next, the fibers are briefly butt-coupled at the touch point, and a gap of ~10 μm is made. The splicer then produces another short arc while the ~10 μm gap is closing, to slightly soften the fiber ends so that a firm contact is made without air gap when fiber ends are brought into contact. This arc should be weaker than that for normal splicing to avoid fusing the fiber ends. The fiber ends are brought into contact with minimum overlap (negative gap), just enough to squeeze out air gap between the fiber ends. The arc continues but is reduced when the fiber ends actually touch and press together to allow a firm contact and to anneal the joint. Instead of using arc, this butt-coupling can also be achieved with filament splicer, $CO_2$ laser heating, or the same induction heating setup used for glass soldering.

With further reference to FIG. 4, another example system 400 includes a tube or container 401 and a collimating lens 404 configured in a first end of the tube 401. A seal 422 is established between the tube 401 and the lens 404. A single mode fiber 402 is coupled to a first end of the collimating lens 404. The single mode fiber 402 outputs light which is coupled via the collimating lens 404 and the second lens 406 into a fundamental mode of the HC-PCF 416. A second lens 406 is supported by a structure 412 at a second end of the tube 401. The second lens 406 can receive a first signal 408 from a second end of the collimating lens 404 and output a second signal 410 that couples with a first end of the HC-PCF 416.

A gas tube 418 configured to introduce gas through the structure 412 into a chamber. A sealant such as solder 420 and/or 422 can be used to seal at least one of the collimating lens 404, the second lens 406, and the structure 412 within the tube 401. Glass solder could be used, for example. A third signal output from a second end of the HC-PCF 416 is received at a detector (not shown in FIG. 4). The structure 412 can have an outer diameter, for example, 3-5 mm. The tube 401 can have, for example, an outer diameter of 6 mm and an inner diameter of 5 mm.

With reference to FIGS. 1A, 1B and 2, a third lens 114, 208 can be deployed in a second structure 102, 202 that supports a second end of the HC-PCF 104. A second gas tube 118, 212 can be provided as well, wherein the second structure 102, 202 supports the second gas tube 118, 212 and the third lens 114, 208. The third signal is output from the second end of the HC-PCF 104 through the third lens 114, 208 to the detector 110. The second gas tube 118, 212 introduces gas in and out of the second structure.

The coupling for the first end of the HC-PCF 416 and the second end of the HC-PCF 416 suppress back reflections into the system. The second structure further can include a hermetic seal between a portion of the HC-PCF 416 and the third lens 114, 208. The structure can further include a hermetic seal between a portion of the HC-PCF 416 and the second lens 406. When the first end 415 of the HC-PCF 416 is angle cleaved, the mating SMF input fiber 402 can be cleaved at a corresponding angle and butt coupled to the HC-FCF, resulting in two fibers at an angle so that light is launched straight into the hollow core 414.

Figure 5:
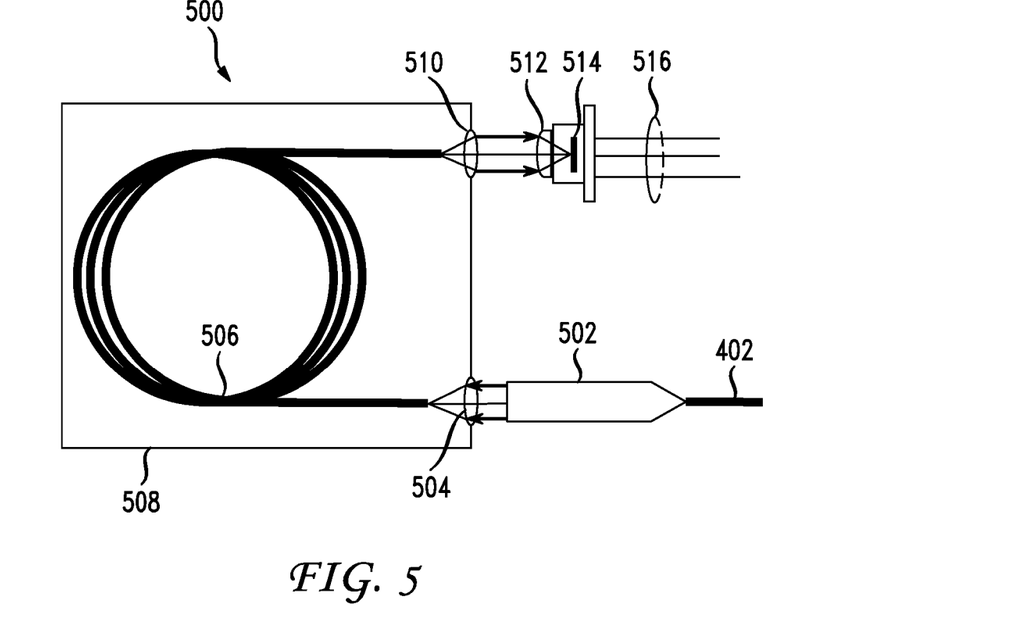
FIG. 5 illustrates another example of a system or apparatus connecting a single mode fiber to an HC-PCF for detection.
Figure 6:
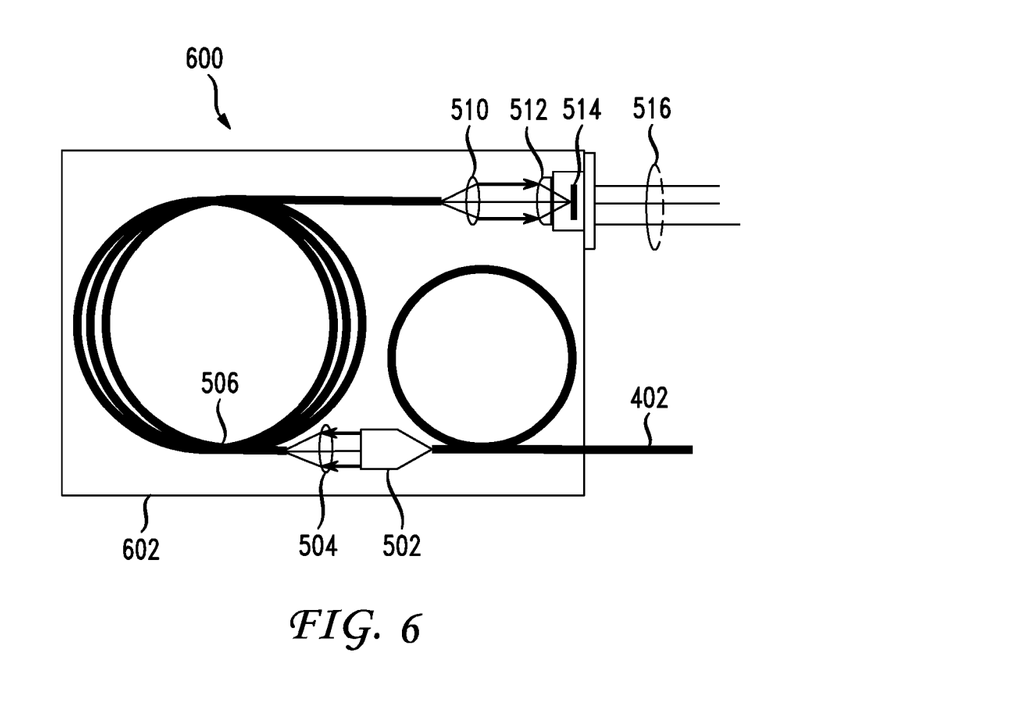
FIG. 6 illustrates another example of a system or apparatus connecting a single mode fiber to an HC-PCF for detection.

FIG. 5 illustrates a structure 500 in which the SMF 402 is coupled to a HC-PCF 506 in an enclosure 508 with the use of a collimating lens 502 and a second collimating lens 504 positioned and/or sealed in an opening of the container 508 that communicates the signal from the SMF 402 to the HC-PCF 506. At another opening of the container 508 is another lens 510 as well as an additional lens 512 that directs the signal to a detector 514 with output leads 516. Both lenses 504 and 510 are sealed to container 508 and serve as optical windows of the enclosure. FIG. 6 provides an alternate example 600 in which the SMF 402 is brought through and sealed to a wall of the container 602 and the signal is coupled via lenses 502, 504 into the end of the HC-PCF 506. In this example, the lens 510 communicates the signal to lens 512 which directs the signal to the detector 514 which is held within a structure that is configured to be in the container 602 wall. Output leads 516 are shown as well. In one example, the appropriate sealing is performed at the wall openings for the lenses and/or detector structures. An example size of box 500 or box 600 can be 100 mm (L)×100 mm(W)×10 mm (H). Each of these dimensions can vary independently by 35%. A benefit of this package is to seal the gas for a longer time since the box 500 has a lower leak rate and you can seal certain gases such as helium that cannot be sealed by the glass wall of an HC-PCF for a long time.

Figure 7:
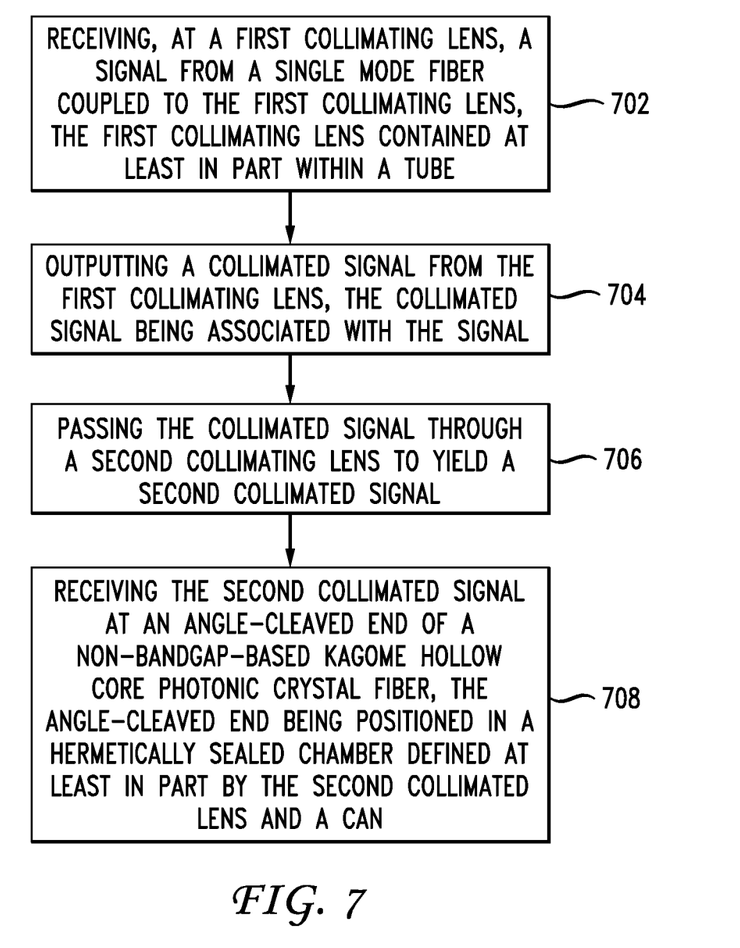
FIG. 7 illustrates a method embodiment.

FIG. 7 illustrates a method example according to one aspect of this disclosure. A system such as FIG. 4 performs the method. The method includes receiving, at a first collimating lens, a signal from a single mode fiber coupled to the first collimating lens, the first collimating lens contained at least in part within a tube (702), outputting a collimated signal from the first collimating lens, the collimated signal being associated with the signal (704), passing the collimated signal through a second collimating lens to yield a second focused signal (706) and receiving the second focused signal at an angle-cleaved end of a hollow core photonic crystal fiber, the angle-cleaved end being positioned in a hermetically sealed miniature chamber defined at least in part by the second collimated lens and a can (708). In one example, the fiber is a non-bandgap-based kagome hollow core photonic crystal fiber.

Figure 8:
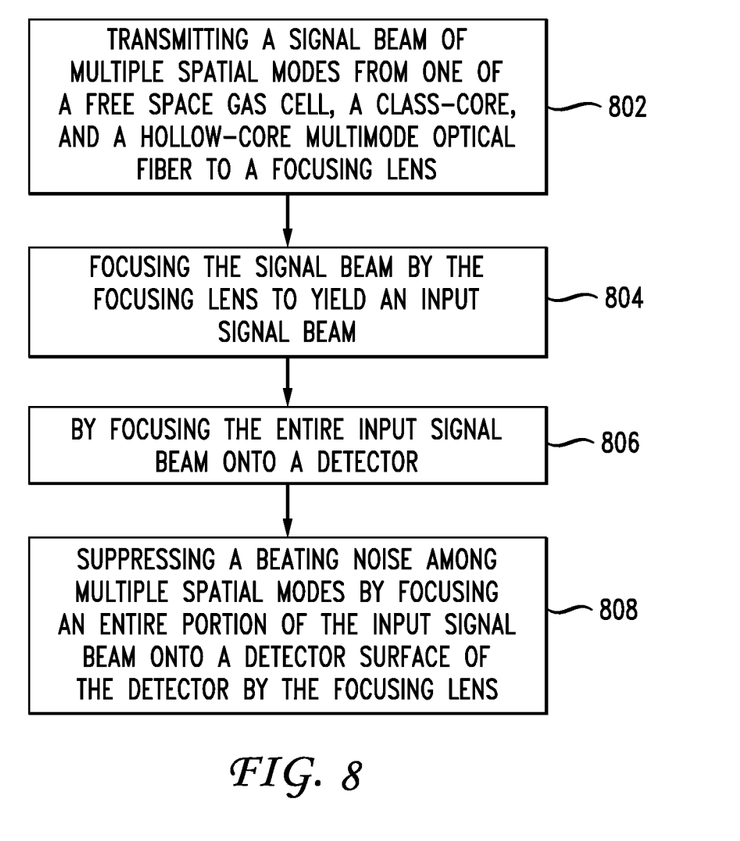
FIG. 8 illustrates another method embodiment.

FIG. 8 illustrates another embodiment. A method includes transmitting a signal beam of multiple spatial modes from one of a free space gas cell, a glass-core, and a hollow-core multimode optical fiber to a focusing lens (802) and focusing the signal beam by the focusing lens to yield an input signal beam (804). The method further includes receiving the input signal beam at a detector (806) and suppressing a beating noise among multiple spatial modes by focusing an entire input signal beam onto a detector surface of the detector by the focusing lens (808). The method may also include focusing substantially all of the input signal beam onto the detector surface. The detector surface is large enough to catch the input signal beam entirely. The signal beam of multiple spatial modes can be transmitted from the glass-core or hollow-core multimode optical fiber and is collimated by a collimating lens. In another aspect, there is no focusing lens as is shown in FIG. 1A and the detector surface is placed within 1 mm to the input fiber end and catches the entire input beam. The system can include a focusing lens in one aspect and not use a focusing lens in another aspect.

In an alternative, the signal beam can also come from a non-fiber-based laser source. The method disclosed in FIG. 8 can be adapted to change the steps such that the method includes monitoring the total laser power of a laser beam (fiber or non-fiber output) without suffering the beating noise. If the laser beam is too strong, a small fraction of the laser beam can be picked off by a beam splitter. The small fraction can serve as the signal beam. The picked off beam (or the signal beam) has the same beam profile as the main laser beam.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A system comprising:
   a tube;
   a collimating lens configured in a first end of the tube, wherein a single mode fiber is coupled to a first end of the collimating lens;
   a second lens supported by a structure at a second end of the tube, the second lens receiving a first signal from a second end of the collimating lens and outputting a second signal that is coupled into a first end of a hollow core photonic crystal fiber;
   a first gas tube configured to introduce gas through the structure into a miniature sealed chamber formed by sealing at least one of the collimating lens and the second lens to the structure using a sealant; and
   a detector that receives a third signal output from a second end of the hollow core photonic crystal fiber.

2. The system of claim 1, further comprising:
   a third lens; and
   a second structure that supports a second end of the hollow core photonic crystal fiber; and
   a second tube, wherein the second structure supports a second gas tube and the third lens, wherein the third signal is output from the second end of the hollow core photonic crystal fiber through the third lens to the detector.

3. The system of claim 1, wherein the sealant is glass solder.

4. The system of claim 1, wherein the second gas tube introduces gas into the second structure.

5. The system of claim 1, wherein the first end of the hollow core photonic crystal fiber and the second end of the hollow core photonic crystal fiber are angle-cleaved.

6. The system of claim 1, wherein the single mode fiber outputs light which is coupled via the collimating lens and the second lens into a fundamental mode of the hollow core photonic crystal fiber.

7. The system of claim 1, wherein the coupling for the first end of the hollow core photonic crystal fiber and the second end of the hollow core photonic crystal fiber suppress back reflections into the system.

8. The system of claim 2, wherein the second structure further comprises a hermetic seal between a portion of the hollow core photonic crystal fiber and the third lens.

9. The system of claim 1, wherein the structure further comprises a hermetic seal between a portion of the hollow core photonic crystal fiber and the second lens.

10. The system of claim 1, wherein the first end of the hollow core photonic crystal fiber and the second end of the hollow core photonic crystal fiber are cleaved without an angle.

11. The system of claim 1, wherein the hollow core photonic crystal fiber comprises a non-bandgap-based kagome hollow core photonic crystal fiber.

12. A method comprising:
    receiving, at a first collimating lens, a signal from a single mode fiber coupled to the first collimating lens, the first collimating lens contained at least in part within a tube;
    outputting a collimated signal from the first collimating lens, the collimated signal being associated with the signal;
    passing the collimated signal through a second collimating lens to yield a second focused signal; and
    receiving the second focused signal at an angle-cleaved end of a hollow core photonic crystal fiber, the angle-cleaved end being positioned in a hermetically sealed chamber defined at least in part by the second collimated lens and a can.

13. The method of claim 12, wherein the can is contained at least in part within the tube and is soldered between the can and the tube.

14. The method of claim 12, wherein a gas tube introduces, through the can, gas into the hermetically sealed chamber.

15. The method of claim 12, wherein the second focused signal comprises a quasi-Gaussian beam with a beam waist of at least 0.5 mm in diameter.

16. The method of claim 12, wherein the second focused signal is in a fundamental mode of the hollow core photonic crystal fiber.

17. The method of claim 12, wherein hollow the core photonic crystal fiber comprises a non-bandgap-based kagome hollow core photonic crystal fiber.

* * * * *